(12) United States Patent
Ketola et al.

(10) Patent No.: US 6,670,470 B1
(45) Date of Patent: Dec. 30, 2003

(54) MODIFIED STARCH

(75) Inventors: Hannu Ketola, Hämeenlinna (FI); Peggy Hagberg, Maidstone (GB)

(73) Assignee: Raisio Chemicals Ltd., Raisio (FI)

( * ) Notice: Subject to any disclaimer, the term of this patent is extended or adjusted under 35 U.S.C. 154(b) by 0 days.

(21) Appl. No.: 09/522,826

(22) Filed: Mar. 10, 2000

Related U.S. Application Data

(63) Continuation-in-part of application No. PCT/FI98/00684, filed on Sep. 2, 1998.

(30) Foreign Application Priority Data

Sep. 10, 1997 (FI) .................................................. 973651

(51) Int. Cl.$^7$ ............................ C08B 31/00; C08L 3/10; C09J 103/10
(52) U.S. Cl. ...................... 536/105; 536/106; 536/107; 536/124; 106/162.7; 127/71
(58) Field of Search .................................. 536/105, 106, 536/107, 124; 106/162.7, 162.51; 127/71, 32, 33; 162/175

(56) References Cited

U.S. PATENT DOCUMENTS

| | | | |
|---|---|---|---|
| 2,307,684 A | * 1/1943 | Kauffmann et al. ............ 127/33 |
| 3,557,091 A | 1/1971 | Martin et al. ............. 260/233.5 |
| 3,655,644 A | 4/1972 | Durand ................. 260/233.3 R |
| 4,029,885 A | * 6/1977 | Buikema ...................... 536/50 |
| 4,048,434 A | * 9/1977 | Speakman ................... 536/105 |
| 4,952,279 A | * 8/1990 | Ikeda et al. .................. 162/175 |
| 5,179,021 A | * 1/1993 | Du Manoir ................. 435/278 |
| 5,368,690 A | * 11/1994 | Solarek ....................... 162/175 |
| 5,997,945 A | * 12/1999 | Shasha et al. ............ 427/213.3 |

FOREIGN PATENT DOCUMENTS

EP 0 143 643 A1 6/1985

* cited by examiner

Primary Examiner—James O. Wilson
Assistant Examiner—Leigh C. Maier
(74) Attorney, Agent, or Firm—Connolly Bov Lodge & Hutz LLP

(57) ABSTRACT

The present invention relates to a process for the preparation of a stable, chlorine free modified starch which is useful in paper coating and sizing. In the process, starch is degraded by catalyzed hydrogen peroxide oxydation, and stabilized by acetyl esterification, combined with crosslinking of the starch.

19 Claims, 9 Drawing Sheets

MODIFIED STARCH

CROSS-RELATED TO RELATED APPLICATION

Figure 1A:
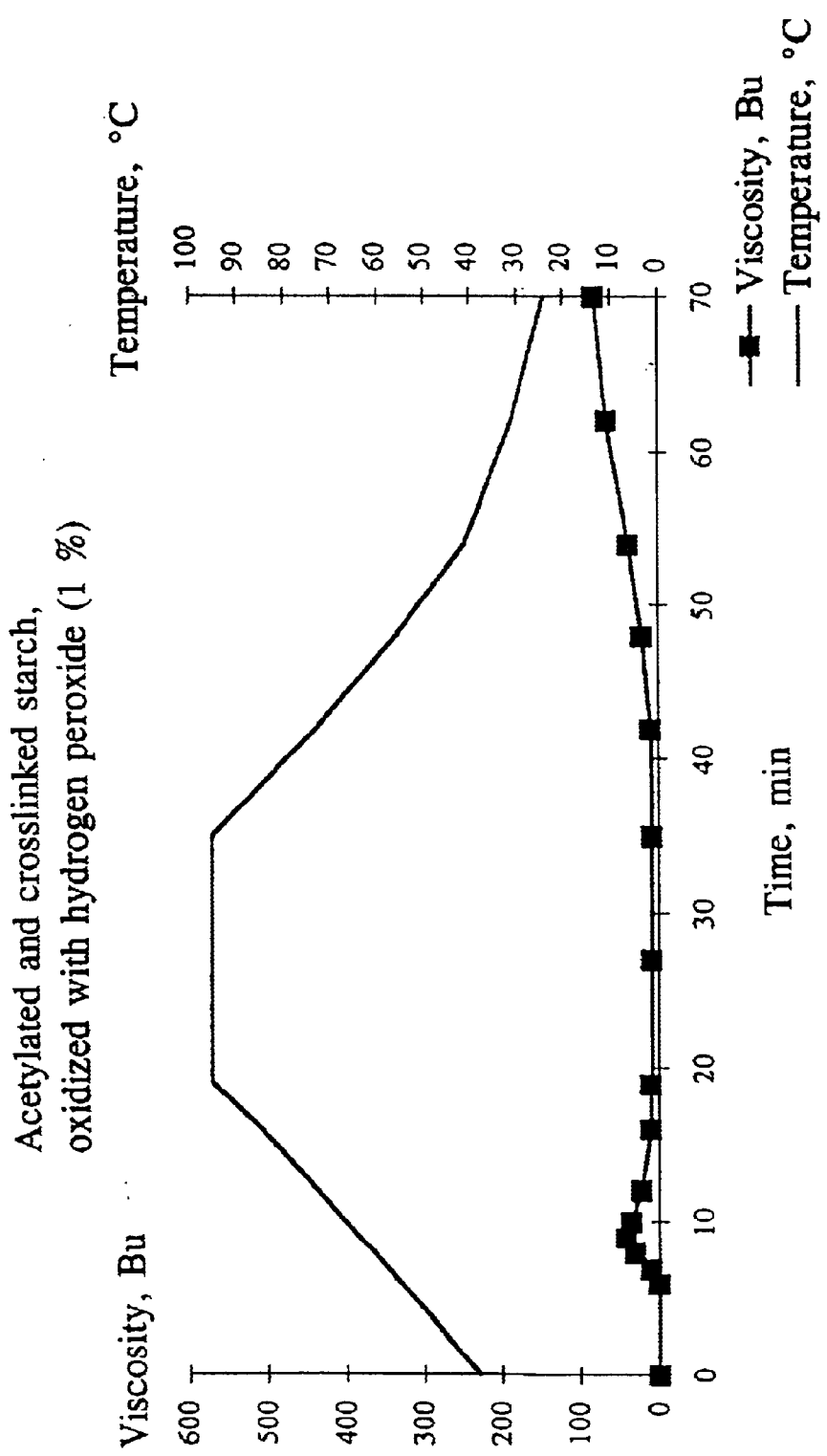
Figure 1B:
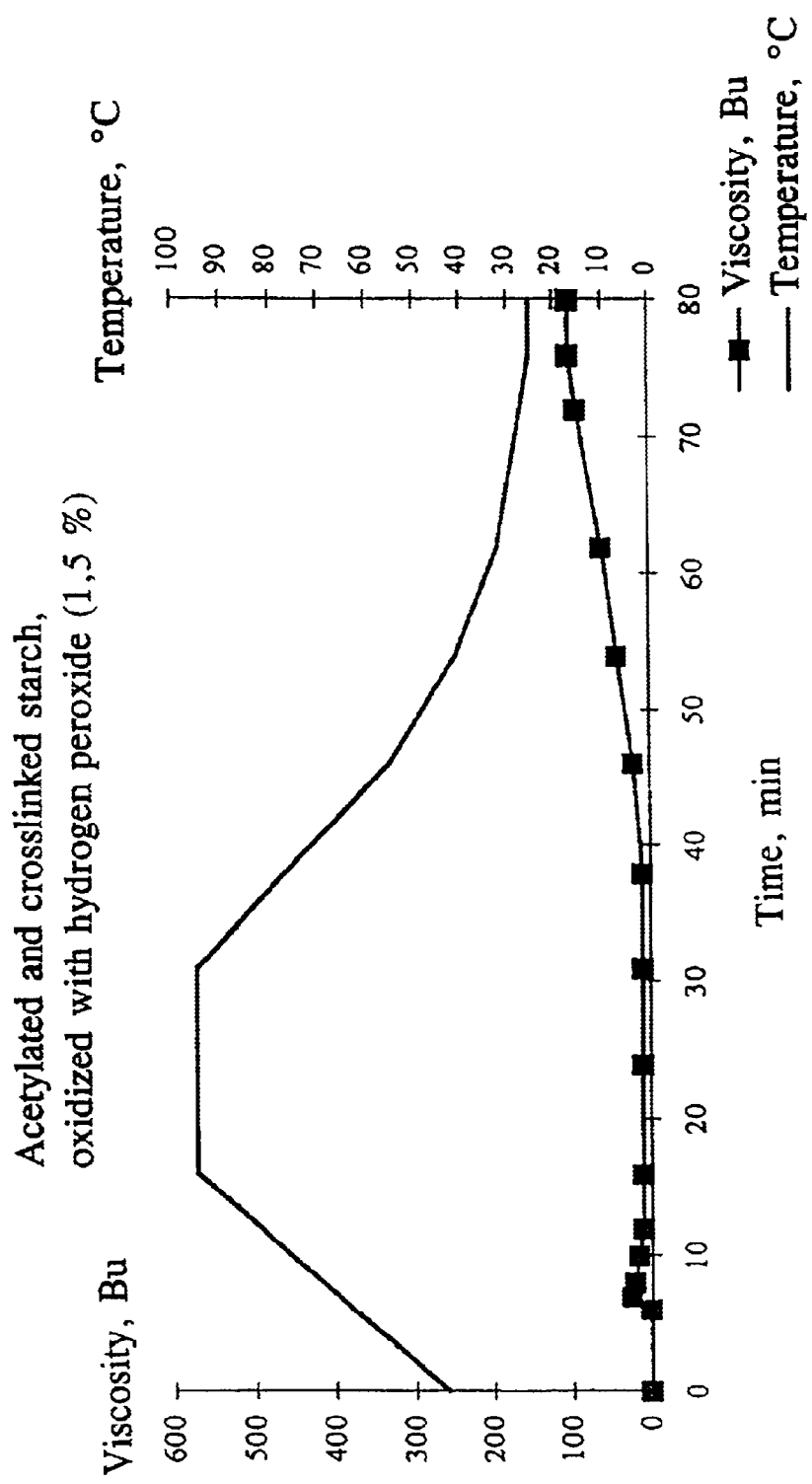
Figure 1C:
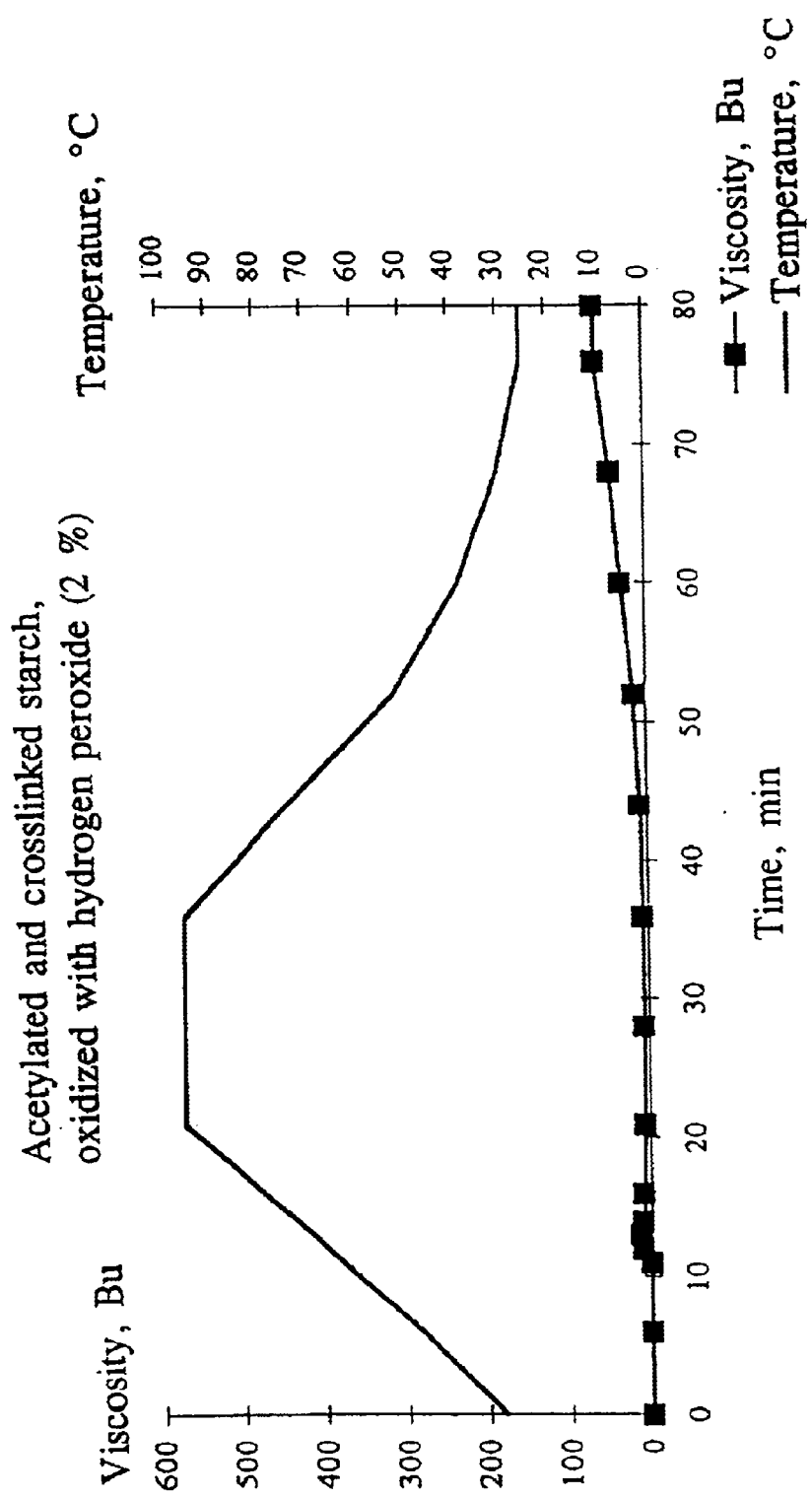
Figure 2A:
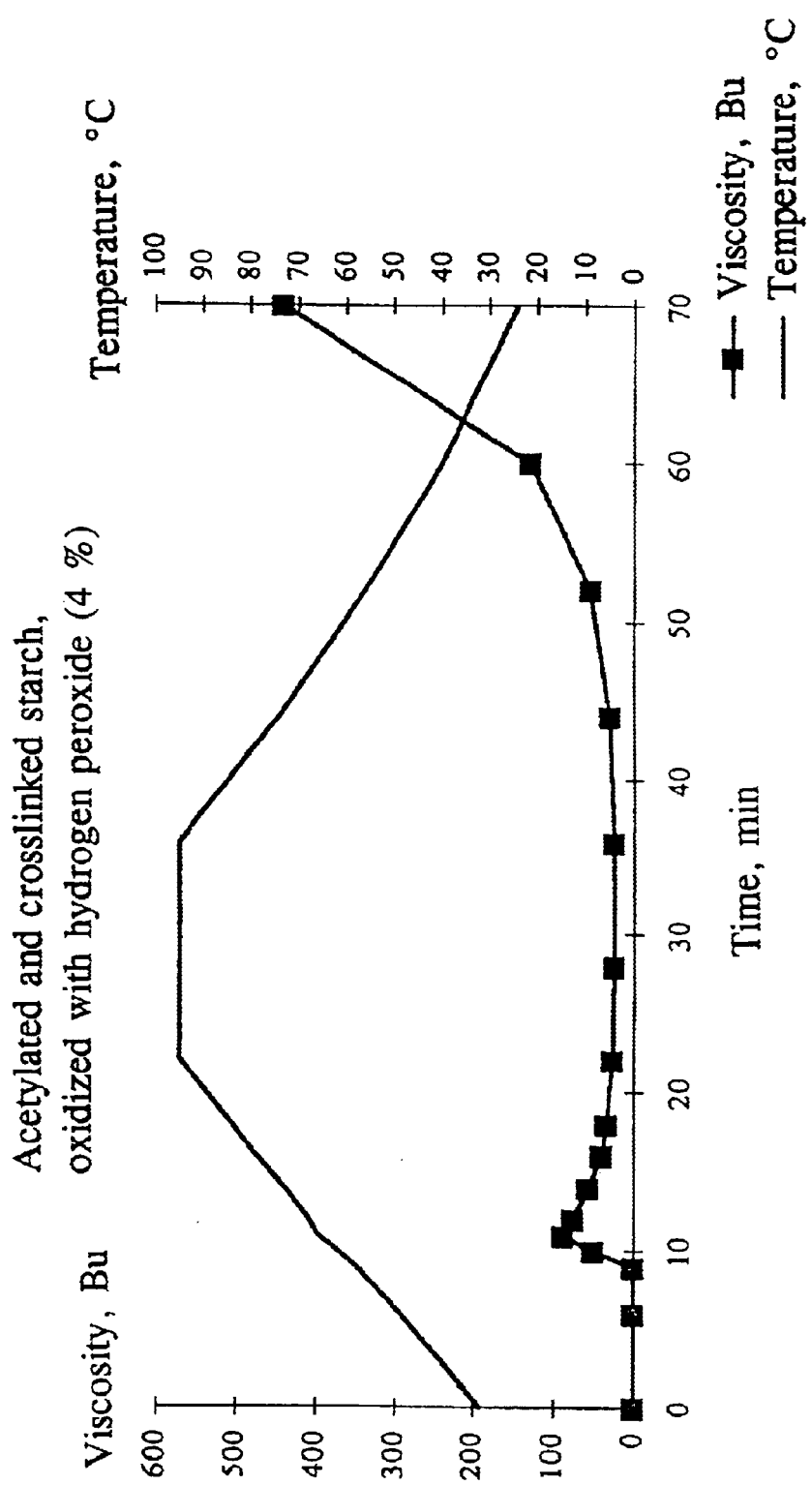
Figure 2B:
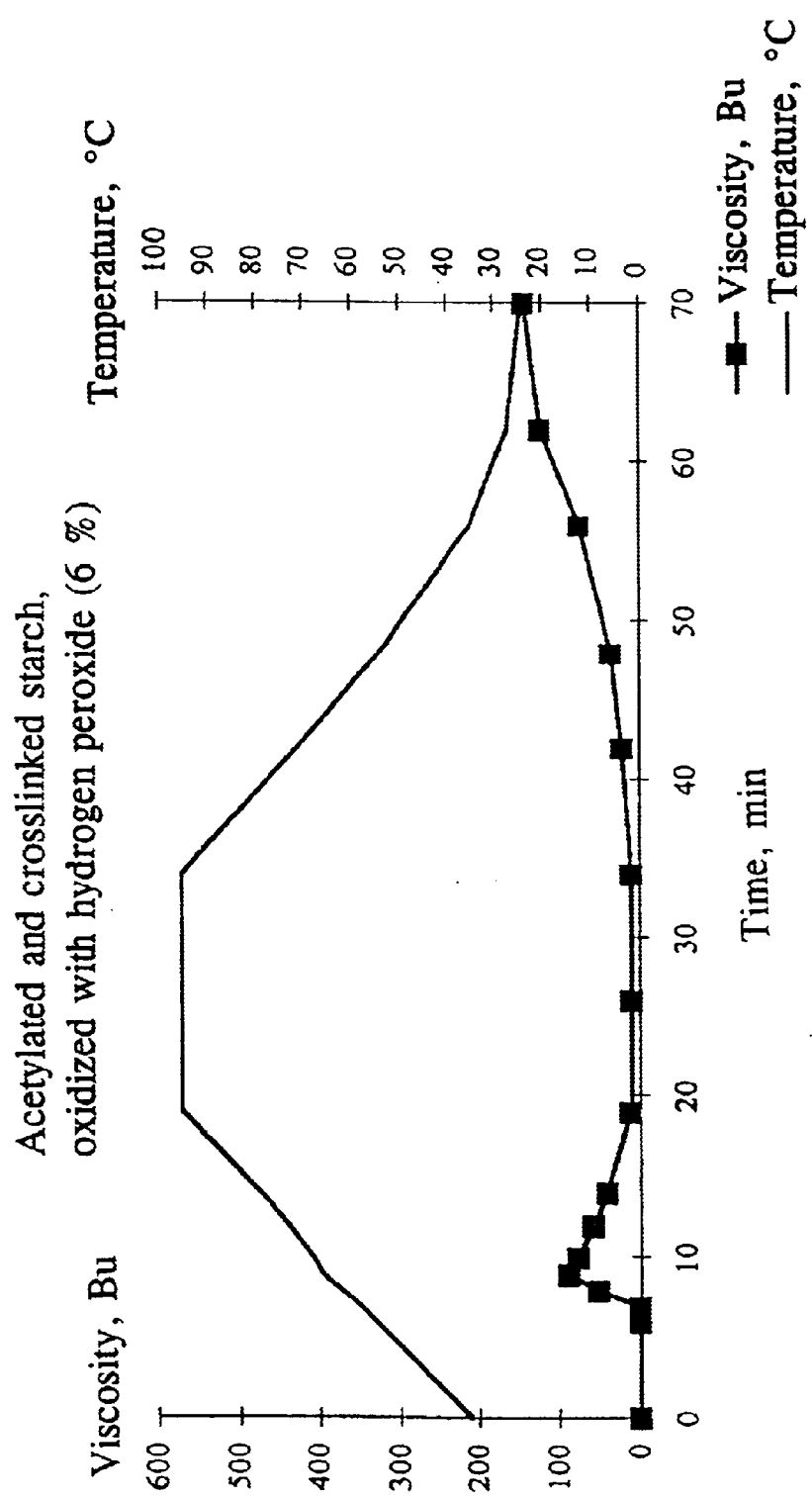
Figure 2C:
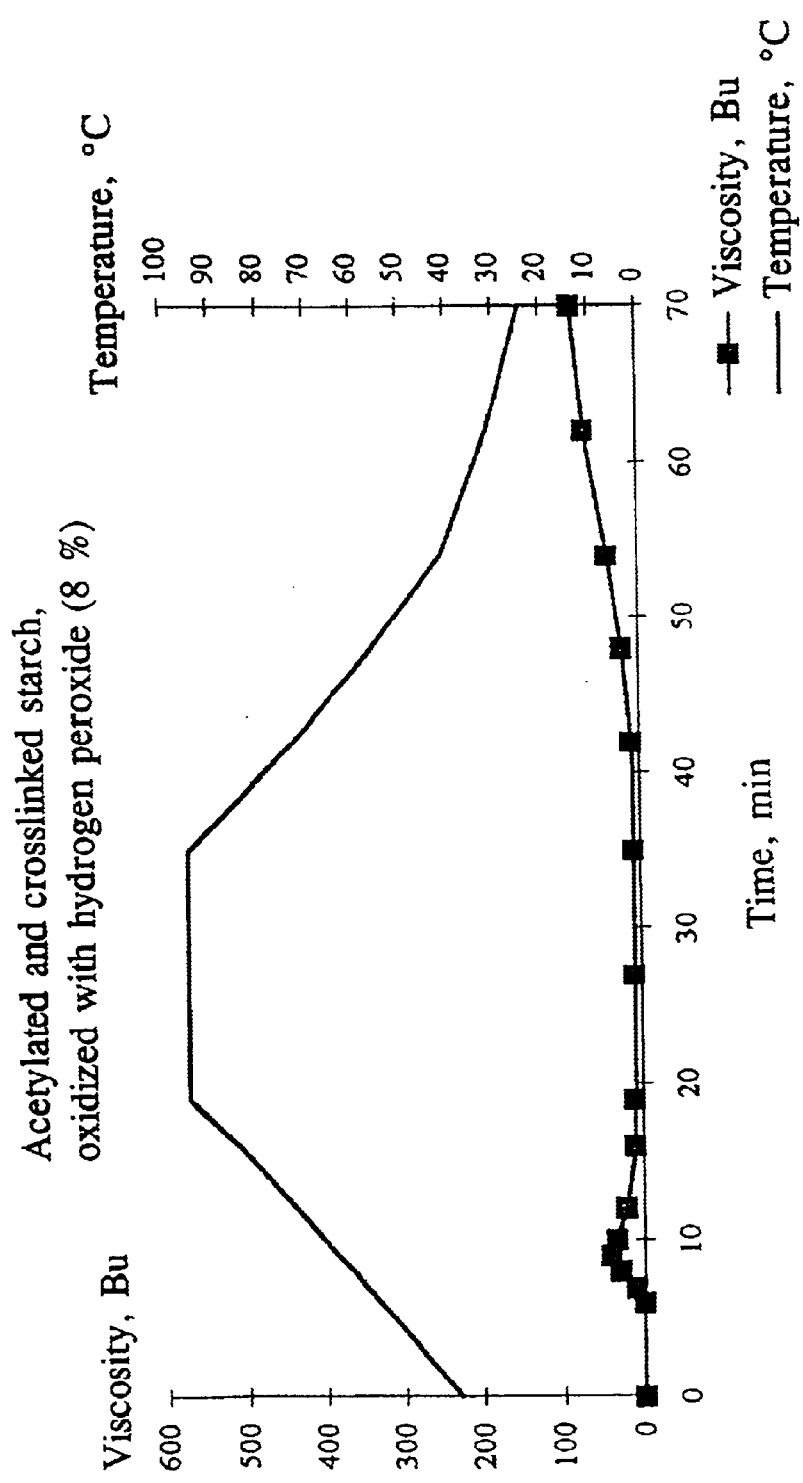
Figure 3A:
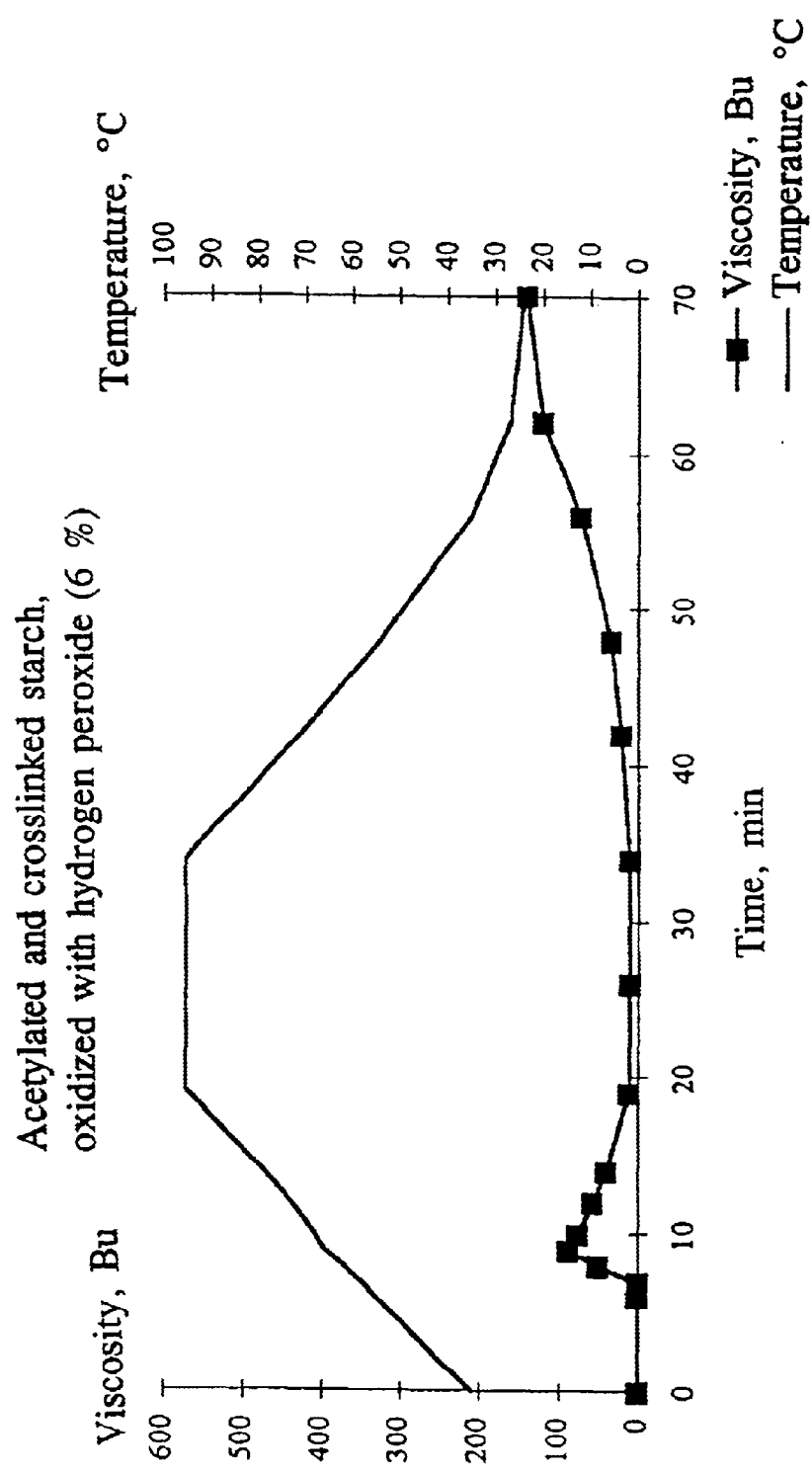
Figure 3B:
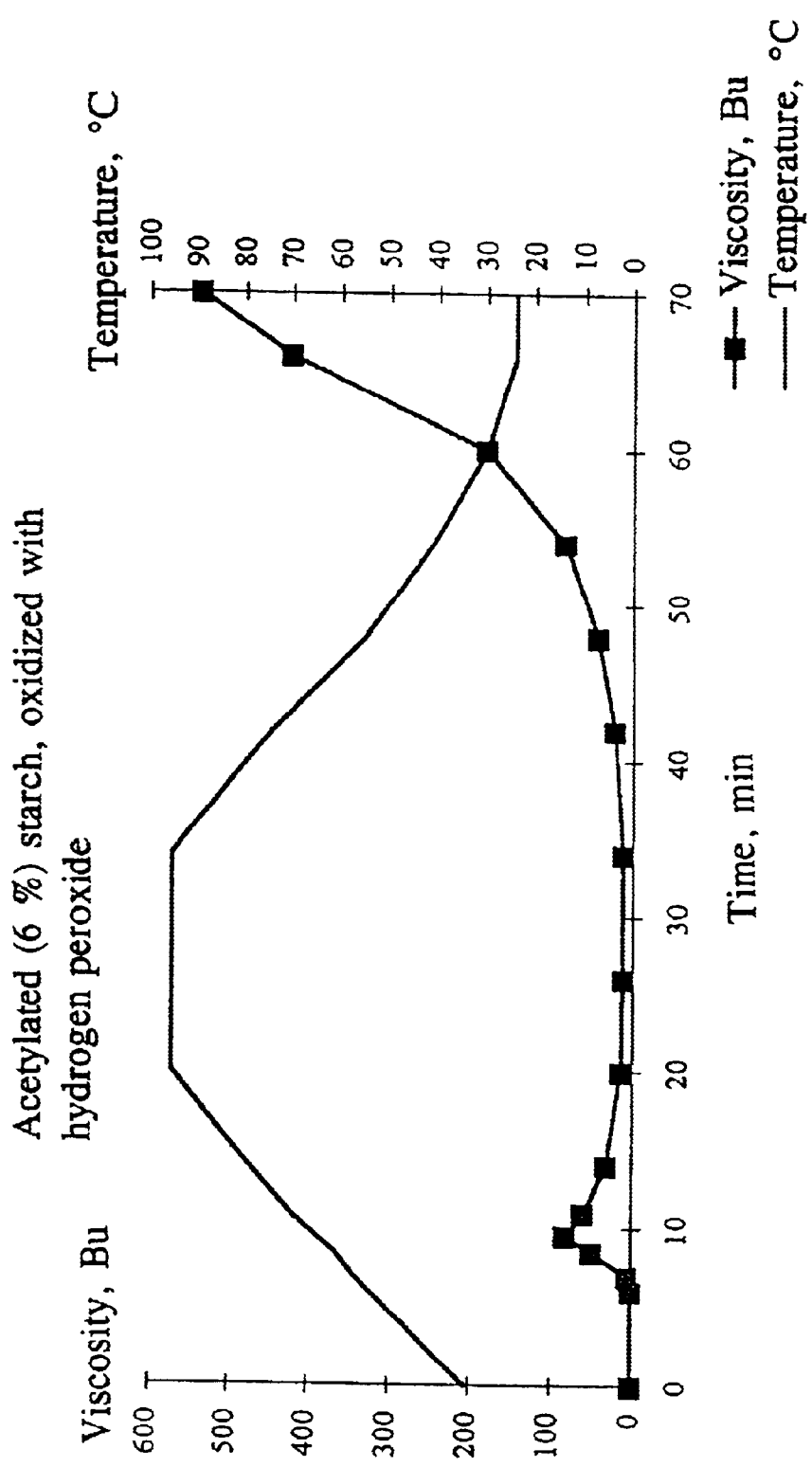

This application is a continuation-in-part of International Application No. PCT/FI98/00684 filed Sep. 2, 1998.

The invention relates to a way to prepare stable, chlorine free modified starch which is useful in paper coating and sizing.

Starches, which for the most part are modified starch derivatives, are one of the most used raw material group in paper industry, besides fibres and pigments. Starch is used either as mass starch increasing the dry strength of the paper, whereby it is added to the mass in the wet end of a paper-making machine, or as surface size, whereby the starch solution is spread onto the surface of dried paper. Additionally, starch is used in paper industry as a binder in coating pastes and colours, as a protecting colloid in AKD dispersions, and as a stem in starch based fixatives.

Starch is a carbohydrate present in all plants in nature. It is present in concentrated form in seeds, roots and tubers, where it functions as stored food for the new growing season. Starch is a glucose polymer, in which anhydroglucose units are linked to each other with α-D-glucosidic bonds. Glucose chains are either linear (amylose) or branched (amylopectin). In a normal case the proportion of amylose is smaller than that of amylopectin, about 20 to 25%. The size of a starch chain is also variable, depending on the plant from which the starch has been isolated, or if it is the question of amylose or amylopectin. Amylose has a shorter chain than amylo-pectin.

The sizing properties of starch are based on the large number of its hydroxyl groups, which are able to form hydrogen bonds. In a water solution the hydrogen bonds are formed between hydroxyl groups and water molecules. Thereby the starch binds water by means of hydrogen bonds, which is an important characteristics e.g. in a coating paste and colour. During drying water molecules are removed and hydrogen bonds are formed between starch, fibres and other components used in paper making, whereby the starch functions as a dry strength size in the paper and in coating paste.

Starch is insoluble in cold water. When a mixture of starch and water is heated, starch begins to dissolve, to gelatinize, at a certain temperature, which can be seen as the rise of the viscosity of the solution. Viscosity is raised with continued heating, until individual starch chains. begin to detach from each other, which is observed as a lowering of viscosity. When the solution is cooled, the starch chains begin to associate anew to each other by means of hydrogen bonds, whereby the viscosity again raises. In a dilute solution the associated starch chains settle onto the bottom of the container, but concentrated solutions form a three-dimensional gel. The phenomenon is called retrogradation.

The gelatinizing properties of starch can be studied by a Brabender-viscograph, by the help of which the behavior of starch is detected during heating and cooling. Starch sludge is heated in the device with an even rate up to 95 ° C., kept there for 15 minutes, whereafter the solution is cooled with an even rate to room temperature. All the time during the determination, viscosity and temperature are measured, and graphs for them are drawn.

Starch solutions have two functional characteristics:

Viscosity: As by polymer solutions in general, the viscosity of a starch solution depends on the average molecular size. In addition to the molecular size, viscosity is effected by temperature, dry matter and the ionic concentration of the solution (pH, hardness, conductibility).

Stability: As concentrated solutions starch has a tendency to retrograde when cooling, which is detected as rising of viscosity, as turbidity or as solidifying of the solution. Retrogradation is mainly caused by the linear chains, which are easily attached to each other by means of hydrogen bonds. When starch is degraded, the proportion of linear chains increases. The stability increases, when the branching and the number of side chains are increased.

Solutions of natural starches retain their fluidity when cooked and again cooled to room temperatures provided the dry matter concentrations of the solutions do not exceed about 5%. The concentration of dry matter below which a cooked and then cooled solution of starch retains its fluidity is hereby defined as the retrograde concentration.

The modification of the starches can be divided into two main types: chemical and Theological. In this connection the chemical modification means the substitution of starch with chemical groups and by means of them changing the charge condition of the starch, or increasing the stability. Since starch is a polyol, these modifications are mostly ethers or esters. Rheological modifications are made, when higher dry matter contents are desirable in solutions, which means decreasing the viscosity by hydrolysis or oxydation. For hydrolysis, enzymes or acids can be used, and for oxydation, e.g. sodium hypochlorite or hydrogen peroxide. This kind of products include surface sizes and binders of coating paste and colour. In some cases, such as in cationic surface sizes, both modifications are made.

Starch products with low viscosity, used in surface sizing and as binders of coating pastes, are usually prepared by oxidizing with sodium hypochlorite. Besides hydrolyzing starch chains to shorter fragments, hypochlorite forms carboxyl groups which stabilize the product. The stability of the products is very important in modified starches used as binders of coating paste, which starches must be prepared and used as solutions, the dry matter of which is high. The definition "high" is used in this connection to mean a dry matter concentration of over 5%, which is not possible to achieve with a starch in natural state so that the solution retains its fluidity. Preferably the dry matter concentration of the starch is between 10 to 15% by weight, which are commonly used values for starch solutions in paper surface size compositions. Even higher concentrations can be used, up to 25% or higher, which concentrations are applicable in coating applications for paper or cardboard. As indicated above, the stability of a starch solution means in this connection such a solution which, while cooling, does not retrograde to a hard gel, but retains its fluidity.

A general objective in pulp and paper industry is to try to decrease formation of organic chlorine compounds (OX) in manufacturing processes, which has led to decreased use of chlorine. AOX-determination (AOX-absorbable organic halogen) is used as the measure of organic halogen compounds, which indicates the amount of elementary halogen bound to organic material. Since in this connection chlorine is the most common halogen, in practice reference can be made to organic chlorine compounds Since starch is a raw material commonly used in paper industry, demands have been presented to use also starch modifying processes where no chlorine is used, as the risk of the formation of organic chlorine compounds is obvious also when oxidizing with hypochlorite. Compounds formed can remain in the product and be carried with the product to the paper mill, which for its part increases the amount of organic chlorine compounds in paper and is detrimental when trying to manufacture OX-free paper.

Two required characteristics for the starches for coating and surface size compositions for paper and cardboard are thus: low viscosity and stability.

Besides by hypochlorite oxidizing, the viscosity can be decreased with other oxidizers, such as hydrogen peroxide oxidation, or by hydrolyzing with an acid. Hydrogen peroxide oxidizing has been used e.g. in U.S. Pat. No. 3,655,644, where viscosity has been decreased using a copper catalyst, without which hydrogen peroxide does not function as a starch degrading agent. In said patent subsequent acetylation is also disclosed. By this process a desired viscosity level for instance for paper coating compositions is obtained, but the stability of the products is insufficient in view of paper coating, when dry matter contents of the starch is raised to the above named levels used for surface size or coating compositions. The products having a this high dry matter content start loosing their fluidity when cooled after cooking, i.e. they start to retrograde.

The retrogradation of a starch thinned by a catalyzed hydrogen peroxide oxidation can be prevented in accordance with the invention so, that the starch is stabilized by combined acetylation and crosslinking after thinning. The proceeding produces cooked starches which retaining their fluidity in cooled solutions even in dry matter concentrations of 25% or higher.

The prior art discloses the publication EP-A-143643 which suggests the combined acetylation and c ross-linking treatment for starch. The treated starch is intended for food industry purposes and the aim is to achieve a starch of high viscosity. The high viscosity presupposes the treatment of a starch with its natural molecule size. By the treatment the viscosity can be retained in the severe temperature and shearing environmets of food processing. In said process the cross-linking effect is achieved by adipic acid, which is a harmfull component in food products.

In order to lower the contents of said component the publication EP-A-143643 suggests a pretreatment with hydrogen peroxide of the starch in order to increase its reactivity towards the adipic acid. A higher reativity means the need of lower amounts of adipic acid for the intended cross-linking effect.

In the starch products manufactured by the process according to the invention, degradation of starch with hydrogen peroxide and copper catalyst, as well as stabilization by acetylation and cross-linking, enables the preparation of modified starch products without chlorine. The products corresponds to products oxidized with hypochlorite. The products according to the invention may be used as binders for coating pastes and as surface sizes in the same way as products oxidized with hypochlorite, which appears from the Examples described hereafter illustrating the invention.

Although potato starch is used as a raw material in the Examples, it is to be appreciated that in the process according to the invention all known commercial starches may be used.

Figure 4:
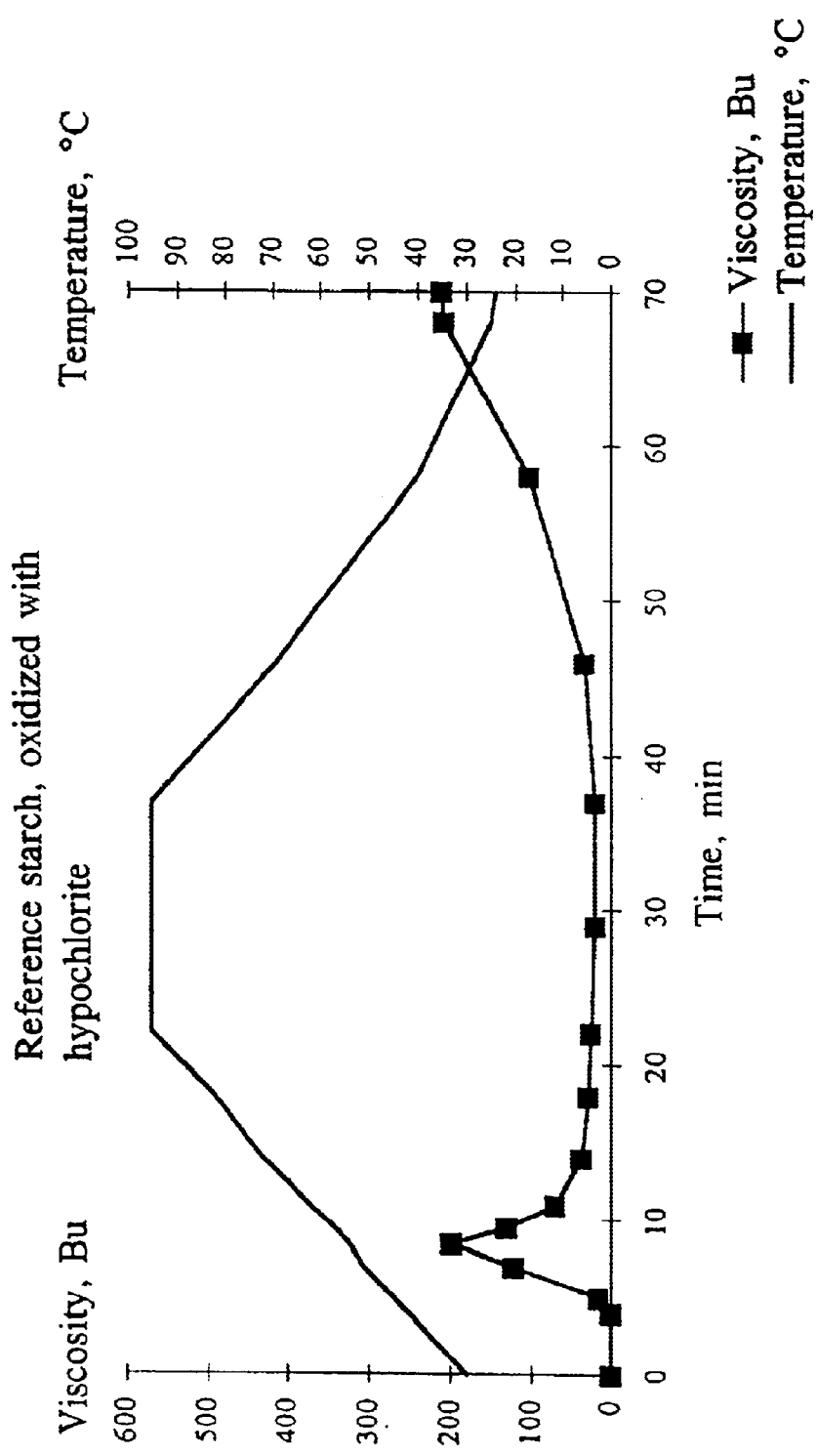

The stability comparisons in the Examples are made in dry matter concentrations of 25%. It is, however, evident that the noted differences between the modifications prevail, or are even more pronounced at higher concentrations. In coating applications the dry matter content of the starch is possible to be rised up to 35%. FIGS. 1a–1c, 2a–2c, and 3a–3b are Brabender curves for modified starches of the invention. FIG. 4 is a Brabender curve for a reference starch.

EXAMPLE 1.

This example describes the preparation of modified starches according to the present invention to different viscosity levels by changing the amount of oxidizer 1200 g of potato starch were suspended into 1200 ml of water. The suspension was heated to 40° C. and pH was adjusted to 10 with 3% NaOH solution. 0.015% of copper sulphate ($CUSO_4 \times 5H_2O$) was added. Three different tests were made, in which a) 1%, b) 1.5% and c) 2% of active hydrogen peroxide, calculated from the amount of the starch, were added. The mixtures were allowed to react for two hours while maintaining the solution at pH 10. After the reaction time had expired, pH of the suspension was adjusted to 8, and 6% of acetic anhydride, calculated from the amount of starch, was added, in which 0.15% of adipic acid, also calculated from the amount of starch, had been dissolved. The mixture was allowed to react for two hours maintaining pH at 5–6, whereafter the suspension was neutralized to pH 5–6.

A sample was taken from each of the three modified starch suspensions, which were diluted, and cooked in a microwave oven so that the dry matter was 10%. The viscosities of the cooked solutions were measured by Brookfield viscosimeter, 100 rpm, spindle 1. The results are in the Table below, from which it appears that the process may be used to prepare products differing in their viscosity level.

| Test | Viscosity |
| --- | --- |
| 1a | 22 mPas |
| 1b | 19 mPas |
| 1c | 16 mPas |

Brabender-curves were also run from the test products in the concentration of 25, showing that the stabilities of the products are good. The curves are given in Appendices 1a, 1b and 1c.

Brookfield-viscosity of the product oxidized with commercial hypochlorite is 21 mPas. The Brabender-curve of the same product is given in the Appendix 4.

EXAMPLE 2.

This example describes the effect of the acetylation level to the stability of the test products.

Test products were prepared as in Example 1, but using constant 2 hydrogen peroxide dosage and three different acetic anhydride dosages: a) 4%, b) 6% and c) 8%. In crosslinking 0.15% of adipic acid, calculated from the amount of starch, dissolved in acetic anhydride, was used in all three tents.

The test products were analysed as in Example 1. The Brookfield-viscosity values were:

| Test | Viscosity |
| --- | --- |
| 2a | 18 mPas |
| 2b | 18 mPas |
| 2c | 17 mPas |

Brabender-curves run in the concentration of 25% are given in Appendices 2a, 2b and 2c. From the curves it appears that the stability increases strongly with increasing acetic anhydride dosage from 4% to 6%, but the change between 6% and 8% is fairly small.

EXAMPLE 3.

This example describes the effect of cross-linking to the stability of the starch solution.

The test modification was carried out as in Example 1, using for oxydation 2% of hydrogen peroxide, calculated from the amount of starch, and for acetylation 6% of acetic anhydride. In test a) 0.15% of adipic acid was used for cross-linking. In test b) no cross-linking was carried out.

The products were analysed by running Brabender-curves, which are given in Appendices 3a and 3b. The curves show that cross-linking stabilizes the starch solution significantly and is thus essential for obtaining a competitive result.

EXAMPLE 4.

Preparation of coated paper means coating of paper with a paste, which contains pigments, binders and some additives. Modified, most commonly oxidized starch is used as a binder. In this example the applicability of the new starches for a binder of a coating paste was tested. The tests were carried out by preparing test pastes from the starches 2a, 2b and 2c in a laboratory, using a basic recipe, containing 7 parts of latex and 6 parts of starch per 100 parts of pigments (calcium carbonate/kaolin 70/30), and comparing them to a paste prepared from starch oxidized by hypochlorite. The dry matter of the paste was 62%.

From the pastes Brookfield-viscosity was determined, 100 rpm, spindle 4, as well as Haake-viscosity which gives a picture of the behavior of the paste in high shear forces. In addition, water retention was determined, which represents the ability of the paste to keep the water it contains. A sufficient water retention is important because of the runnability, since the paste may not moisten too much the base paper to be coated.

| Test | Starch | Brookfield-viscosity mPas | Haake-viscosity mPas | Water retention g/m$^2$ |
| --- | --- | --- | --- | --- |
| 4a | 2a | 1000 | 37 | 0.079 |
| 4b | 2b | 1000 | 35 | 0.074 |
| 4c | 2c | 1100 | 36 | 0.088 |
| 4d | ref. | 1500 | 38 | 0.038 |

The results show that the test products are suitable for a binders of a coating paste.

EXAMPLE 5.

In this example organic chlorine compounds are analysed, which arise during the preparation of the products, or are included in the products themselves. In the example the analysis results of the product 2b are compared to those of a product oxidized with hypochlorite. The AOX-determination was carried out both on the filtrate water, which represents the waste water arising during the preparation, and on the finished dried starch.

| Starch | AOX of the filtrate water mg/l | AOX of the product mg/kg |
| --- | --- | --- |
| 2b | 3.6 | 5 |
| ref. | 74.0 | 90 |

The results show that during the preparation of the product prepared according to the process of the invention significantly smaller amounts of organic chlorine compounds are both arising, and-retained in the product itself.

What is claimed is:

1. A process for the preparation of modified starch, the process comprising:

a) oxidizing a substrate starch with hydrogen peroxide, wherein said oxidizing is catalyzed with a catalyst;

b) esterifying said oxidized starch; and c) cross-linking said oxidized starch, and wherein said process is performed without the use of reagents comprising chlorine.

2. A process for the preparation of modified starch, according to claim 1, wherein said oxidizing step was performed at 40° C. and wherein the pH of said aqueous solution is adjusted to 10 with NaOH.

3. A process for the preparation of modified starch, according to claim 1 wherein after said oxidizing step and prior to said esterifying step the pH of said solution is adjusted to 8.

4. A process for the preparation of modified starch, according to claim 1, wherein after said esterifying step the pH is adjusted to 5–6.

5. A process for the preparation of modified starch, according to claim 1, wherein said catalyst is copper sulfate.

6. A process for the preparation of modified starch, according to claim 5, wherein said copper sulfate is present at from 0.01 to 0.02% by weight of starch.

7. A process for the preparation of modified starch, according to claim 1, wherein said hydrogen peroxide is present at from 0.1 to 2% by weight of starch.

8. A process for the preparation of modified starch, according to claim 1, wherein said esterifying comprises treating with acetic anhydride.

9. A process for the preparation of modified starch, according to claim 1, wherein said cross-linking comprises treating with adipic acid.

10. A process for the preparation of modified starch, according to claim 1, wherein said esterifying comprises treating with acetic anhydride and wherein said cross-linking comprises treating with adipic acid.

11. The process of claim 10, which further comprises dissolving the adipic acid in the acetic anhydride.

12. The composition of matter comprising: a modified chlorine free starch prepared according to the process of claim 1, wherein the starch comprises 5 mg/kg or less of organic chlorine compounds, wherein said substrate starch has a first retrograde concentration, and said modified starch has a second retrograde concentration higher than said first retrograde concentration, wherein:

said retrograde concentrations are determined by the Brabender method.

13. The composition of matter, according to claim 12, wherein the dry matter content is less than 40%.

14. The composition of matter, according to claim 12, wherein the dry matter content is less than 30%.

15. The chlorine free modified starch, according to claim 12, wherein the dry matter content is up to 25%.

16. The method of sizing paper comprising;
    a) providing paper to be coated; and
    b) applying the composition of matter comprising the modified chlorine free starch according to claim 12, to at least one surface of said paper.

17. The method of binding pigments and colorants to paper, the method comprising:
    a) providing paper to be coated;
    b) providing a paste comprising the composition of matter comprising the modified chlorine free starch according to claim 12, pigments, and appropriate additives; and
    c) applying said paste to said paper.

18. The sized paper, according to claim 16.

19. The coated paper according to claim 17.

* * * * *